United States Patent Office 3,711,267
Patented Jan. 16, 1973

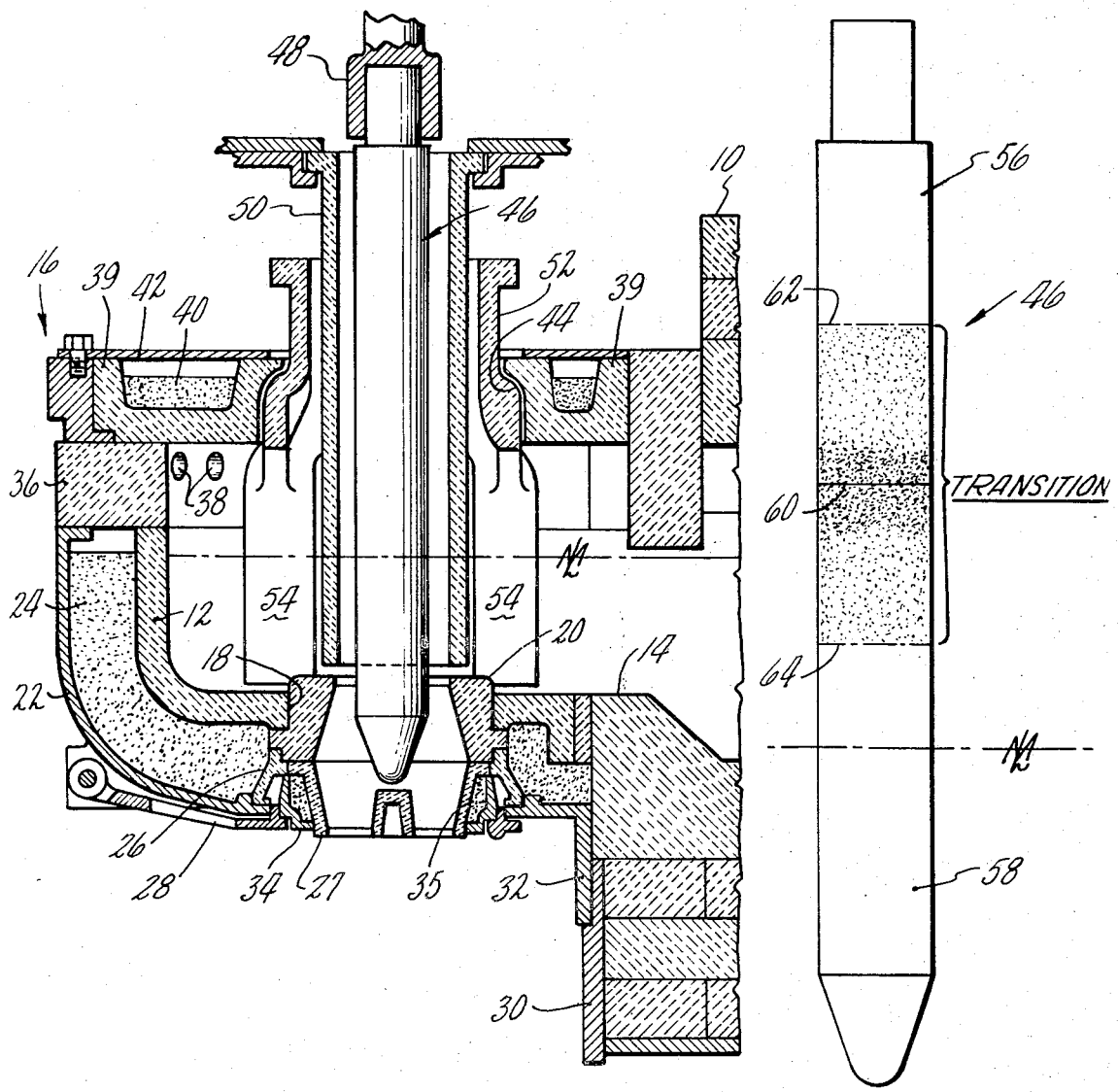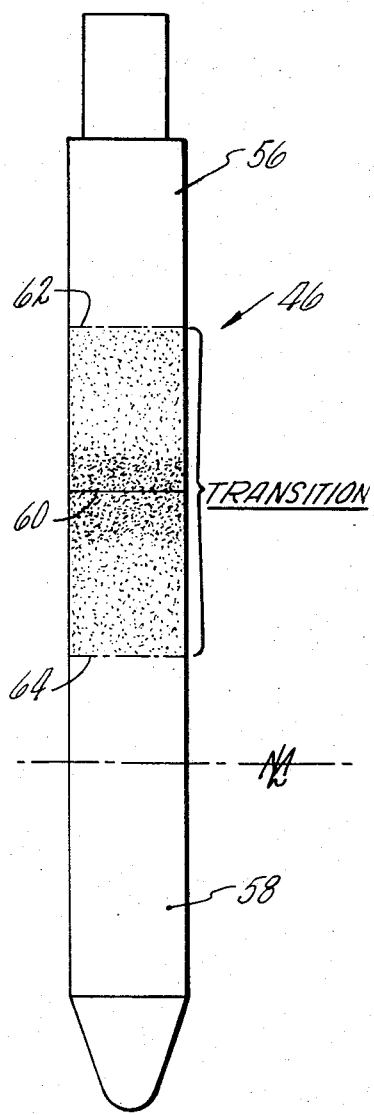

3,711,267
COMPOSITE REFRACTORY FOR USE IN MOLTEN GLASS FEEDER
A. D. Fentzke, Granby, Conn., assignor to Emhart Corporation, Bloomfield, Conn.
Continuation of abandoned application Ser. No. 796,060, Feb. 3, 1969. This application July 26, 1971, Ser. No. 166,226
Int. Cl. C03b 11/06
U.S. Cl. 65—330                                    1 Claim

ABSTRACT OF THE DISCLOSURE

A feeder bowl is mounted at the end of a molten glass forehearth, and has a reciprocating plunger and rotating tube for feeding gobs of the molten glass through an orifice in the outlet spout of the feeder bowl. To combat the tendency for the plunger to act as an electrode in a galvanic cell created in the molten glass the plunger is made up from two refractory materials, one for use in the glass, the other for use above the glass surface to electrically insulate the submerged portion from the metallic plunger operating mechanism. A method is disclosed for forming the composite refractory plunger in three zones, the upper and lower zones being distinct materials, and the third zone being formed integrally with the other two as a transition zone comprising a mix of the two refractory slip compositions introduced through a series of bifurcated metering valves in the hoses or pipes normally used in the slip casting process. The upper zone comprises approximately 90% by weight of alumina, and the lower zone less than 80% by weight of this material. Zirconia is present to the extent of less than 2% by weight in the upper zone, and comprises approximately 10%–15% by weight of the composition of the lower zone. The transition zone comprises a substantial percentage of alumina and some silica is present in all three zones.

---

This application is a continuation of application Ser. No. 796,060, entitled Composite Refractory for use in Molten Glass Feeder, filed Feb. 3, 1969, in the name of A. Daniel Fentzke, and now abandoned.

BACKGROUND OF INVENTION

In the formation of glassware articles in a glassware forming machine uniform gobs of molten glass must be fed from the outlet spout of a feeder bowl, which is mounted at the downstream end of a molten glass forehearth or channel. The temperature of the molten glass in the forehearth is accurately controlled and the glass in the feeder bowl is therefore provided at a particular viscosity so that the feeder mechanism in the bowl can form the glass gobs by allowing predetermined quantities of glass to flow through one or more orifices in the feeder bowl outlet spout. A vertically reciprocable plunger is usually associated with each orifice, and is arranged inside a rotating tube. Both the plunger and tube are immersed in the glass so that their lower end portions are disposed adjacent the orifice. A stirrer may be provided outside the rotating tube to further enhance the homogeneity of the glass in the feeder bowl as described in Pat. No. 2,654,184 issued to Peiler Oct. 6, 1953. The above-mentioned components of the feeding mechanism are preferably made from so-called glass contact refractories, and it is an important requirement for such refractories that the material be resistant to erosion in the glass as it moves therein, that it be resistant to thermal shock, and that no corrosion occur so as to cause contamination of the glass.

One such refractory material which has been developed is A-Z-S refractory compound. This material comprises approximately 74% alumina ($Al_2O_3$), 11% zirconia ($ZiO_2$), and 15% silica ($SiO_2$). This refractory material has been found to fulfill all of the foregoing requirements, but one deleterious effect of using plungers, etc. made from such a material in soda-lime glass is that this particular refractory material has been observed to cause very fine bubbles or blisters in the glass adjacent the plunger surface, resulting in a condition sometimes referred to as "smoke streak."

Petrographic and other known methods of examination of used A-Z-S refractory components as well as standard blister potential tests of the raw material have revealed that the refractory material itself cannot be the sole source of these gaseous bubbles or blisters in the glass. In theory, these blisters or bubbles may be caused as a result of the creation of a galvanic cell in the feeder bowl. A non-equilibrium condition may be present in the typical feeder bowl as a result of a thermally induced EMF. Temperature gradients of over 1100° C. exist between the submerged end of a plunger and the external end which is held in a plunger chuck. Another possible cause of electric potential in the feeder bowl might be the presence of "two glasses," for example the regular glass and any contaminated glass adjacent the interface between the regular glass and a refractory portion of the feeder bowl. Still another possible cause of induced EMF in the glass filled feeder bowl might be attributed to the configuration of the refractory components of the feeder mechanism. With one or more plungers and associated tubes arranged in depending relationship above the outlet spout a galvanic action might be created in the molten glass between one or more of these components and/or the orifice defining refractory plate itself. Since all of these parts of the feeder bowl are connected to a common ground, the frame of the bowl, it will be apparent that a significant galvanic cell action could occur in the molten glass. The foregoing theoretical analyses are not intended to be all inclusive but only suggestive of possible causes of the non-equilibrium condition found to exist in feeder bowls, especially those equipped with A-Z-S refractory components.

SUMMARY OF INVENTION

This invention relates to improving the quality of glass delivered to a glassware forming machine or other glass molding apparatus, and deals more particularly with a novel refractory composite for use in fabricating molten glass feeder bowl components, especially plungers or the like.

An object of the present invention is to provide a refractory composite for use in fabricating a feeding apparatus component which will not be subject to excessive erosion, corrosion, or thermal shock, and which component will also not contribute to the non-equilibrium galvanic cell condition sometimes encountered with present-day refractory components.

BRIEF DESCRIPTION OF DRAWING

FIG. 1 is a vertical sectional view through a feeder bowl mounted on a forehearth, and shows a single plunger and tube suitable for successively forming two gobs of molten glass by inducing the molten glass in the bowl to flow through the side-by-side orifices in the feeder bowl outlet spout.

FIG. 2 is an elevational view of the plunger shown in the FIG. 1 apparatus.

DETAILED DESCRIPTION

Turning now to the drawing in greater detail, FIG. 1 shows a feeder bowl and associated molten glass feeding mechanism at the downstream end of a molten glass forehearth 10. The reader is referred to Pat. No. 2,139,911, issued Dec. 13, 1938 and assigned to the assignee herein for a more detailed description of a forehearth of the type shown at 10 in FIG. 1. Such a forehearth 10 includes a channel for feeding molten glass to the feeder bowl, and includes means for conditioning and fining the glass so that the glass is delivered to the feeder bowl at a particular temperature, and hence at a particular viscosity, which has been optimized to facilitate the formation of glass gobs at the outlet spout of the feeder bowl.

The feeder bowl shown, including the glass feeding mechanism therein, comprise substantial duplicates of the corresponding components shown in Pat. No. 2,654,184, issued Oct. 6, 1953, and it is noted that such a feeder bowl is shown by way of example only, it being apparent from the description to follow that the present invention is well adapted for use in a feeder bowl of this or any other type. As described in detail in the above-mentioned patent, the feeder bowl of FIG. 1 comprises a bowl shaped refractory element 12 operatively joined to the refractory forehearth flow channel 14 so that molten glass from a supply melting tank furnace (not shown) may flow through the channel and into the feeder bowl to fill the latter to a predetermined level, as indicated by the melt line in FIG. 1. The feeder bowl 10 has a cover structure, indicated generally at 16, and defines a bottom opening 18 in which a tubular outlet member 20 is provided to permit withdrawing molten glass from the interior of the feeder bowl. The bowl itself is made of glass resistant refractory material and may be made in one piece, or in two pieces as described in the above-mentioned patent. As there described, and as shown in FIG. 1, the feeder bowl includes an exterior metal shell, or casing 22, located in spaced relationship to the exterior of the refractory bowl 12. The space therebetween is filled with a pulverized insulating material indicated generally at 24. The metal shell 22 also defines an outlet spout opening, located in centered relationship below the opening 18 in the refractory bowl 12, and a support ring 26 is provided in said shell opening to support the member 20. A hinged orifice plate holder 28 is hingedly mounted to the outlet spout casing 22 and supports the orifice plate 27 in a conventional manner. The metal shell portion of the feeder bowl 22 is joined to the metallic casing 30 of the forehearth by a depending portion indicated generally at 32. In the example shown, the orifice plate 27 defines two side-by-side orifices since the particular embodiment shown in FIG. 1 is intended for use with a double gob glassware forming machine of the type adapted to simultaneously produce pairs of glassware articles in each of its various sections. While the orifice plate 27 may be supported in its associated holder 28 in any number of ways, in the embodiment shown in FIG. 1 an annular support ring is preferably provided as indicated generally at 34 for this purpose. This construction permits granular insulation to be provided therebetween as shown at 35.

The cover portion 16 of the feeder bowl may include burner blocks 36, 36 having openings 38, 38 through which burners (not shown) are adapted to fire for retaining the temperature of the molten glass in the bowl portion 12. With further reference to the cover 16 of the feeder bowl, refractory blocks 39, 39 are provided with pockets in which a pulverized refractory material 40 is placed. These pockets are covered by a metal plate 42. The cover 16 also defines an opening 44 for receiving the various parts of the glass feeding mechanism to be described, and said opening 44 is arranged in spaced relationship above the outlet spout opening 18 defined in the feeder bowl 12.

The molten glass feeding mechanism shown in FIG. 1 comprises a refractory plunger 46 which is vertically reciprocable between the position shown and a raised position in timed relationship with operation of the glassware forming machine by suitable mechanism (not shown). A chuck 48 is provided for supporting the refractory plunger 46 to be described in greater detail herein below. A refractory tube 50 is provided in generally coaxial relationship with respect to the plunger 46, and has a lower end portion located in closely spaced relationship to an upstanding curb portion of the outlet member 20. Means is provided for rotating the tube and the reader is referred to the above-mentioned patent, No. 2,654,184, for a more complete description of the mechanism for reciprocating the plunger 46 and for rotating the refractory tube 50. This patent also shows and describes mechanism for rotating the stirrer or rotor 52 provided in closely spaced radial relationship outside of the rotating tube 50. This stirrer 52 may be used in a feeder bowl of the type disclosed herein for assuring that all of the molten glass in the feeder bowl is maintained at a relatively constant temperature and, more particularly, for assuring that the temperature of the molten glass as it enters the feeder bowl from the forehearth 10 does not vary too much from the temperature of the glass most remote from the forehearth. Paddles 54, 54 are provided on the rotor for agitating the molten glass in the feeder bowl to accomplish this mixing action.

Turning now to a more complete description of the present invention, FIG. 2 shows the plunger 46 as comprising an upper portion 56 which includes a necked down upper end which is adapted to be received in the chuck 48, and a lower portion 58 which includes a tapered lower end so shaped as to cause the desired flow of the molten glass through the side-by-side orifices in the orifice plate 27.

It is an important feature of the present invention that these upper and lower portions, 56 and 58 respectively, of the plunger 46 are not constructed of identical refractory compounds. In the embodiment shown, the lower portion 58 of the plunger is constructed of a refractory material which has been found to be especially suitable for use in molten glass. The presently preferred material is an A-Z-S refractory compound which does not have all of the characteristics of the previously described refractory. The chief characteristic of the upper portion is that it exhibits a relatively high electrical resistivity. One such material which has been found to be quite satisfactory for the present purposes is a refractory comprising approximately 90% alumina, and 8% silica. Various other compounds may be present in limited forms to make up the remaining 1%. Thus, the upper portion or zone comprises less than 2% zirconia. As mentioned, the lower portion or zone of the plunger comprises a mix of alumina, zirconia and silica present to the following percentages by weight. Zirconia in the range between 10%–15%, alumina less than 80%, and silica representing the remaining portion. Thus, the intermediate portion of the plunger comprises some silica and a substantial percentage of alumina throughout its length which materials are also present in the upper and lower portions of the plunger as well as to provide a composite refractory characterized by uniformity in most of its physical characteristics save only that of its electrical conductivity and its resistance to errosion and corrosion in molten glass.

It is another important feature of the present invention that the one-piece plunger 46 not only has upper and lower portions which are of somewhat different chemical composition, but it is also noted that the transition zone comprising the intermediate portion of the plunger between the upper and lower portions 56 and 58 respectively does in fact comprise a mix of these materials characterized in that the mid-region interface 60 is made up of 50% A-Z-S and 50% A-S, or such other refractory material from which the upper portion of the plunger is fabricated. Thus, the intermediate or transition zone of the plunger represents that portion of said refractory which varies from the 100% A-Z-S material of the lower portion 58 and the A-S material of the upper portion 56. Stated differently, the upper interface 62 of the transition zone comprises 100% A-S and 0% A-Z-S, whereas in the lower interface 64 of this zone is 100% A-Z-S and 0% A-S. As a result of providing a transition zone which comprises a graded blend of these two refractory materials difficulties in matching coefficients of thermal expansion of the two materials are minimized.

Thus, the refractory plunger 46 shown in FIG. 2 comprises a shank, or upper end portion 56, which is formed from a refractory material having a relatively high electrical resistivity, whereas the lower end portion 58 (or that portion from just above the melt line to the lower submerged end portion) is fabricated from a refractory material characterized by high resistance to erosion and corrosion when immersed in molten glass. While both refractories are resistant to thermal shock, only the upper portion is fabricated from a material of high electrical resistivity.

The rotating tube 50 may also be constructed from two refractory materials, that is, having upper and lower portions or zones characterized by the foregoing physical characteristics and an intermediate transition zone which represents a graded blend between the two materials. The transition zone mixture can be conveniently achieved during the fabrication of such a tube or plunger by feeding, either under gravity or pressure, each of the two or more refractory slip compositions through one of a series of bifurcated metering valves in the conveying hoses or pipes normally used in the casting of such members. The shank or upper end portion of such a mold would be filled and topped with 100% of a high alumina composition, such as the one described having a relatively high electrical resistivity, without sacrificing its high resistance to thermal shock. A feeder bowl equipped with one or more plungers or tubes constructed in this manner has been found to be free from the "smoke streak" glass characteristic of feeder bowls equipped with plungers and tubes constructed solely from the A-Z-S refractory composition.

As described hereinabove with reference to the background of the present invention, the most plausible explanation for the improved results achieved over those possible with conventional refractory components can be attributed to the formation of a galvanic cell with the plunger and most likely the tube acting as electrodes in a cell wherein the molten glass serves as the electrolyte. The two electrodes, namely the plunger and tube tend to act as short circuited electrodes since the mechanism for achieving the motions described for these feeder mechanism components is virtually entirely of metal and hence conducts electricity from and to the molten glass electrolyte. The present invention takes advantage of the fact that refractories of the A-S or alumina-silica variety are characterized by a relatively high electronic resistivity. A refractory selected from the A-Z-S variety on the other hand is characterized by relatively low electrical resistivity especially at the elevated temperatures encountered in a molten glass feeder bowl. The foregoing theoretical explanation of the phenomena upon which the composite refractory concept is based actually evolved from experiments such as the following one. The first step of one laboratory study was to establish whether an e.m.f. could be generated and detected in a simulated feeder bowl. Two electrodes were suspended in a refractory crucible using a refractory cover containing holes to accept the electrodes. The crucible material was a nominal 85% alumina; the cover was a nominal 90% alumina refractory. The electrodes were 1" apart and no portion of any electrode was closer than 1" to the crucible. The approximated submerged depth was 1½" and the electrodes measured approximately ½" x ³⁄₁₆" x 5". The upper end of each electrode was slotted, and into the slot a platinum wire was peened. The crucible was filled with soda-lime cullet to within ½"–¾" of the top when fined. When fined (two hours elapsed time) the electrode assembly was immersed. The glass temperature was 2500° F., attained in a tangential gas fired pot furnace. This procedure was duplicated at varying temperatures ranging from 2200° F. to 2600° F.

An e.m.f. was detected using the above typical cell arrangement. Potentiometers and galvanometers were used. An external voltage (6 v.) was also applied to some cells.

The following observations were made:

(1) Prefining of the glass and insertion of electrodes in the molten glass prevent violent initial boiling or ebullition.
(2) Dissimilar electrodes (A-Z-S vs. A-S) apparently generated a greater EMF than similar electrodes (A-Z-S vs. A-Z-S and A-S vs. A-S). This EMF manifested itself as blisters around one electrode.
(3) The application of an external voltage (6 v.) caused blisters at the electrode attached to the + pole of the 6 dry cells connected in series. This happened with both similar and dissimilar electrodes, and when polarity was reversed. The counter voltage obviously exceeded the EMF generated.

From the preceding experiment results, it was felt that a galvanic action was occurring between the molten glass electrolyte and the plunger electrodes. A conventional feeder bowl with a plunger-tube configuration provides an ideal cell for this type of galvanic action. The molten glass provides a source of positive sodium ions which migrate to the surface of the refractory electrode. The interface glass is thereby enriched with negative oxygen ions, a situation which could conceivably cause seeds or blisters of oxygen gas to form. Since all of this galvanic action depends upon a degree of electrical conductivity in the electrodes and since A-Z-S refractory elements do have a relatively low electrical resistivity (chiefly as a result of the zirconium oxide content), especially at the elevated temperatures involved, the present invention seeks to break the resulting circuit created between the various refractory elements. By fabricating one or more of these elements of a composite refractory the advantages of the A-Z-S material can be retained without carrying with them the deleterious effect of providing a current path for a galvanic cell in the feeder bowl.

I claim:

1. In a feeder bowl of the type used with a molten glass forehearth wherein the glass is refined prior to being fed through orifices in the feeder bowl outlet spout, the improvement comprising an elongated refractory element movably supported from its upper end and extending downwardly toward the feeder bowl outlet, said element having an upper portion which is electrically connected to the supporting structure for the feeder bowl and a lower portion adapted to be immersed in the molten glass, said upper portion being made from a refractory material of high electrical resistivity characterized by a concentration of alumina of approximately 90% by weight and of zirconia of no more than 2% by weight, said element having a lower portion fabricated from a glass contact refractory which is highly resistant to erosion and corrosion in molten glass, said refractory comprising a mix of alumina present to a concentration of less than 80% by weight and of zirconia present at approximately 10%–15% by weight and an intermediate portion of said refractory element integrally connected to the said upper and lower portions, said intermediate portion and said upper and lower portions including some silica by weight and a substantial percentage of alumina to provide a composite refractory element characterized by uniformity in most of its physical characteristics save that of its electrical conductivity and its resistance to erosion and corrosion in molten glass.

References Cited

UNITED STATES PATENTS 2,654,186  10/1953  Peiler _____ 65—330 X
3,436,203  4/1969   Wu _____ 65—362 X ROBERT L. LINDSAY, JR., Primary Examiner U.S. Cl. X.R.

65—362, 374